US012340197B2

(12) United States Patent
Shantharam et al.

(10) Patent No.: US 12,340,197 B2
(45) Date of Patent: *Jun. 24, 2025

(54) PACKAGE DISTRIBUTION AND INSTALLATION IN RESPONSE TO USER LOGON

(71) Applicant: Omnissa, LLC, Mountain View, CA (US)

(72) Inventors: Shravan Shantharam, Cumming, GA (US); Blake Ryan Watts, St. George, UT (US); Kalyan Regula, Alpharetta, GA (US); Varun Murthy, Atlanta, GA (US); Jason Roszak, Brookhaven, GA (US); Nitin Radhakrishna Rao, Atlanta, GA (US); Mohan Guttikonda, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,597

(22) Filed: Sep. 8, 2022

(65) Prior Publication Data

US 2023/0004371 A1    Jan. 5, 2023

Related U.S. Application Data

(63) Continuation of application No. 16/250,404, filed on Jan. 17, 2019, now Pat. No. 11,467,815.

(51) Int. Cl.
*G06F 8/61* (2018.01)
*G06F 8/65* (2018.01)
(Continued)

(52) U.S. Cl.
CPC .................. *G06F 8/61* (2013.01); *G06F 8/65* (2013.01); *G06F 9/44505* (2013.01);
(Continued)

(58) Field of Classification Search
CPC .......... G06F 8/61; G06F 8/65; G06F 9/44505; G06F 21/125; G06F 21/64; H04L 9/0643; H04L 9/3247
See application file for complete search history.

(56) References Cited

U.S. PATENT DOCUMENTS

2005/0075115 A1* 4/2005 Corneille .................. G06F 8/61
455/414.1
2006/0253693 A1* 11/2006 Kanodia .................. H04L 67/04
713/1

(Continued)

OTHER PUBLICATIONS

Viquez Zamora, Jose. "IoT Application Provisioning Service." Aalto University, School of Science, Master's Degree Programme in Security and Mobile Computing (2017). (Year: 2017).*

(Continued)

*Primary Examiner* — Bradley A Teets
*Assistant Examiner* — Joanne G Macasiano
(74) *Attorney, Agent, or Firm* — Kim & Stewart LLP

(57) ABSTRACT

Disclosed are various implementations for distributing and installing packages in response to user logon events. A logon event associated with a user account is detected for a client device. A query containing a respective user account identifier is sent to a provisioning service to retrieve a set of packages to install on the client device. The set of packages are received from the provisioning service and installed on the client device.

20 Claims, 4 Drawing Sheets

(51) Int. Cl.
*G06F 9/445* (2018.01)
*G06F 21/12* (2013.01)
*G06F 21/64* (2013.01)
*H04L 9/06* (2006.01)
*H04L 9/32* (2006.01)

(52) U.S. Cl.
CPC ............ *G06F 21/125* (2013.01); *G06F 21/64* (2013.01); *H04L 9/0643* (2013.01); *H04L 9/3247* (2013.01)

(56) References Cited

U.S. PATENT DOCUMENTS

| | | | | |
|---|---|---|---|---|
| 2013/0130653 | A1* | 5/2013 | Deasy | H04N 21/4437 455/410 |
| 2013/0152067 | A1* | 6/2013 | Fernandez-Ruiz | G06F 9/45529 717/172 |
| 2015/0026675 | A1* | 1/2015 | Csaszar | H04L 67/10 717/178 |
| 2016/0034265 | A1* | 2/2016 | Nguyen | H04L 67/34 717/178 |
| 2018/0248702 | A1* | 8/2018 | Wu | H04L 9/3236 |
| 2018/0367315 | A1* | 12/2018 | Chen | H04L 9/3247 |

OTHER PUBLICATIONS

Rodosek, Gabi Dreo, and Lundy Lewis. "Dynamic service provisioning: A user-centric approach." (2001). (Year: 2001).*

Suraci, Vincenzo, and Massimiliano Taglieri. "Design of Service Discovery & Provisioning Architecture based on the Open Services Gateway Initiative." Proceedings of 14th IST Mobile and Wireless Communications Summit. IICM, 2005. (Year: 2005).*

* cited by examiner

PACKAGE DISTRIBUTION AND INSTALLATION IN RESPONSE TO USER LOGON

BACKGROUND

Provisioning machines for users is often a tedious and time-consuming task. For example, different employees of an enterprise may be members of different groups or business units. As a result, different employees may be required to have different applications or versions of applications installed on their systems. Likewise, different users in different groups may have permissions to access different aspects, features, or functionality of the same application. As a simple example, employees in the accounts receivable department may have permission to access different functions of an enterprise's accounting system or software compared to employees in the accounts payable department. Likewise, management in the accounting department might have permission to access or utilize a wider range of functionality of an accounting software system than lower-level employees.

Typically, information technology (IT) departments would keep images of machines to use for different departments or for different employee roles within a department. Each machine image would contain a copy of the programs that a typical employee in that department or role would require. Likewise, the machine image would have the programs preconfigured for a user with the respective role in the department. Using the accounting department as an example, a first machine image for employees in the accounts-payable department might be configured with software that an accounts-payable clerk would typically use and preconfigured with appropriate permissions. A second machine image would similarly be configured for accounts-receivable clerks. Managers in the accounting department would have a third-machine image maintained for them.

The use of the machine images allows for the IT department to configure a computing device for individuals based on their department and role or position. However, as the number of job roles and departments increases, the number of different machine images that the IT department has to maintain proliferates. In some instances, machine images are also hardware specific. For example, multiple machine images may have to be maintained for laptops from multiple different manufacturers if computers for employees within a particular role or position in a department are sourced from multiple manufacturers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for deploying packages to user devices. In order to avoid having to create custom machine images for individual users or classes of users, packages for individual applications are linked to a user. Once a user logs on to his or her machine for the first time, the packages can be downloaded and installed on the user's device. Packages can continue to be updated on a periodic basis (e.g., in response to periodic checks performed by a service installed on the user's device or at each logon of the user). As a result, a single machine image can be maintained by an IT department, and policies can be configured to specify which packages are to be sent to a computing device when a user first logs on to his or her computing device. In the following discussion, a general description of the system and its components is provided, followed by a discussion of the operation of the same.

Figure 1:
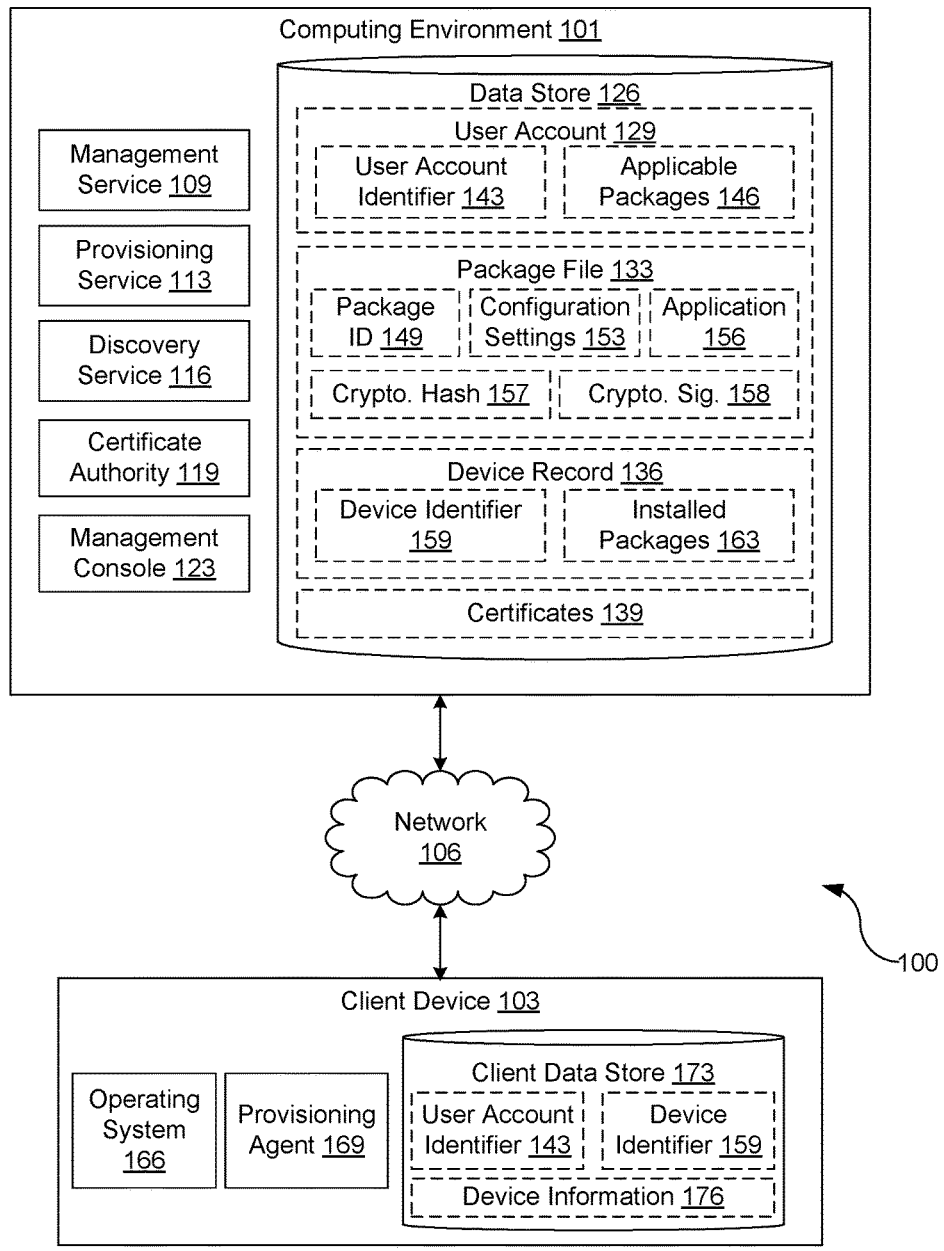
FIG. 1 is a drawing illustrating an example arrangement of a network environment according to various embodiments of the present disclosure.

As illustrated in FIG. 1, shown is a network environment 100 according to various embodiments. The network environment 100 includes a computing environment 101, and a client device 103, which are in data communication with each other via a network 106. The network 106 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 106 can also include a combination of two or more networks 106. Examples of networks 106 can include the Internet, intranets, extranets, virtual private networks (VPNs), and similar networks.

The computing environment 101 can include, for example, a server computer or any other system providing computing capability. Alternatively, the computing environment 101 can employ a plurality of computing devices that may be arranged, for example, in one or more server banks, computer banks, or other arrangements. Such computing devices can be located in a single installation or may be distributed among many different geographical locations. For example, the computing environment 101 may include a plurality of computing devices that together may include a hosted computing resource, a grid computing resource or any other distributed computing arrangement. In some cases, the computing environment 101 can correspond to an elastic computing resource where the allotted capacity of processing, network, storage, or other computing-related resources may vary over time.

Various applications or other functionality can be executed in the computing environment 101 according to various embodiments. The components executed on the computing environment 101, for example, can include a management service 109, a provisioning service 113, a discovery service 116, a certificate authority 119, a management console 113, and other applications, services, processes, systems, engines, or functionality not discussed in detail herein.

Also, various data is stored in a data store 116 that is accessible to the computing environment 101. The data store 116 can be representative of a plurality of data stores 116, which can include relational databases, object-oriented databases, hierarchical databases, hash tables or similar key-value data stores, as well as other data storage applications or data structures. The data stored in the data store 116 is associated with the operation of the various applications or functional entities described below. This data can include one or more user accounts 129, one or more package files 133, one or more device records 136, one or more certificates 139, and potentially other data.

The user account 129 can represent information related to individual users of the client device 103, such as members, agents, or employees of an organization or enterprise. For example, a user account 143 can include a user account identifier 143, a list of applicable packages 146, and potentially other information (e.g., authentication credentials, user information, user permissions, etc.). The user account identifier 143 can include any identifier that uniquely identifies a user account 129 with respect to other user accounts 129. Examples of user account identifiers 143 include usernames, globally unique identifiers (GUIDs), universally unique identifiers (UUIDs), and similar data structures. The list of applicable packages 146 contains a list of package identifiers 149. Each package identifier 149 identifies a respective package file 133 applicable to a user account 129 and that should be installed on a client device 103 operated by a user associated with the user account 129.

The package file 133 can represent a collection, bundle, or grouping of assets and settings applicable to or installable on a client device 103. An example of a package file 133 is a Provisioning Package file used in MICROSOFT WINDOWS® systems. However, other types of systems can implement or use similarly formatted files for the same or similar purposes. These can include REDHAT Package Manager (RPM) files, DEBIAN Package files, Flatpak package files, AppImage package files, and Snap packages.

A package file 133 can include a package identifier 149, one or more configuration settings 153 related to an application 156 or other asset installable with the package file 133, and a copy of the application 156 or other asset itself. A cryptographic hash 157 and a cryptographic signature 158 of the package file 133 can also be stored in association with the package file 133. The package identifier 149 is a unique identifier that uniquely identifies a package file 133 with respect to other package files 133. The package identifier 149 could include a character string representing a name and/or version of the application 156 installable by the package file 133, an application 156 serial number, a GUID, a UUID, or other identifier that is suitable for the same or similar purpose. The configuration settings 153 represent how the application 156 should be configured when installed using the package file 133. For example, the configuration settings 153 could specify various application settings to enable or disable or various application permission to enable or disable. Where the same application 156 could be installed for multiple classes of users with different settings or permissions to be set or enabled, different package files 133 for the same application 156 can be created which use or contain different configuration settings 153. The application 156 represents the installable binary application or similar asset that can be installed on a client device 103 using the package file 133.

The cryptographic hash 157 represents a precomputed hash of the package file 133 using a cryptographic hash function, such as md5, SHA1, SHA2, etc. The cryptographic hash 157 can be used verify the package file 133 has not been corrupted or altered. For example, a change to the package file 133 would result in a change to the cryptographic hash 157. The cryptographic hash 157 may be precomputed, for example, by the provisioning service 113 once a package file 133 is uploaded and stored in the data store 116.

The cryptographic signature 158 represents a signature of the package file 133 using a signing certificate 139. For example, the provisioning service 113 can use a signing certificate 139 to generate a cryptographic signature 158 in order for other applications or services to confirm that the provisioning service 113 is the source of the package file 133 that is received. In some implementations, the signing certificate 139 is a certificate 139 issued by a certificate authority 119 trusted by the applications or services involved in the transmission of the package file 133 (e.g., the client device 103 and the computing environment 101 or provisioning service 113).

The device record 136 can represent information about individual client devices 103 registered with or known to the management service 109 or the provisioning service 113. A device record 159 can include a device identifier 159 that uniquely identifies a device record 136 for a client device 103 with respect to other device records 136. For example, the device identifier 159 could include a device or machine name, a device serial number, a media access control (MAC) address of a network interface installed on the client device, an international mobile equipment identifier (IMEI) assigned to the client device, a GUID or UUID previously assigned to the client device 103, or other suitable identifier. The device record 159 can also include a list of installed packages 163 currently or previously installed on the client device 103. For example, the list of installed packages 163 could include a collection of package identifiers 149 representing all package files 133 that have been assigned to or are currently assigned to the client device 103.

The certificates 139 can represent electronic documents that can certify or prove the ownership of a public key by a particular service, party, user, device, or entity. Certificates 139 may be formatted in various ways, such as the X.509 certificate format. Moreover, certificates 139 can be issued by a certificate authority 119 to various services, parties, users, devices, or entities and their status (e.g., valid, revoked, etc.) can be tracked by the certificate authority 119.

The management service 109 can be executed to administer the operation of client devices 103 registered or otherwise enrolled with the management service 109. To this end, the management service 109 can also provide mechanisms for a client device 103 to enroll or otherwise register with the management service 116. The management service 116 can also enforce the use of various compliance policies. For example, the management service 116 may notify the provisioning service 113 of a set of package files 133 that are to be installed on a specific client device 103 or for a specific user account 129.

The provisioning service 113 can be executed to identify a set of package files 133 to be provided to or installed on a client device 103 and provide copies of the individual package files 133 to the client device 103. For example, in response to a logon for a user account 129, the provisioning service 113 might identify individual package files 133 specified for the user account 129. In response, the provisioning service 113 can provide copies of those package files 133 to the client device 103 for installation and/or configuration. However, in some alternative implementations, the functionality provided by the provisioning service 113 can be implemented by the management service 109. In such implementations, the provisioning service 113 may be viewed as a library, subcomponent, or process implemented or provided by the management service 109.

The discovery service 116 can be executed to facilitate the discovery or identification of a relevant or authorized provisioning service 113 by the client device 103. The discovery service 116 may also provide a cryptographic certificate or public encryption key to the client device 103 for use in communicating with the provisioning service 113 as part of a public-key pinning or certificate pinning service.

The certificate authority 119 can be executed to issue and validate cryptographic certificates. For example, the certificate authority 119 can issue cryptographic certificates to services or devices in response to a request for a certificate. The certificate authority 119 can also validate the authenticity of certificates that have been issued by the certificate authority 119. For example, an application executing on the client device 103 may request that the certificate authority 119 validate a certificate issued to a service or server with which the client device 103 is interacting.

The management console 113 can be executed to provide an administrative interface for configuring the operation of individual components in the network environment 100. For example, the management console 113 can provide an administrative interface for the management service 109, the provisioning service 113, the discovery service 116, and/or the certificate authority 119. The management console 113 can also provide an interface for the configuration of policies applicable to user accounts 129 or the specification of package files 133 to be installed on client device 103 or for user accounts 129. Accordingly, the management console 113 can correspond to a web page or a web application provided by a web server hosted in the computing environment 101.

The client device 103 is representative of a plurality of client devices that can be coupled to the network 106. The client device 103 can include a processor-based system such as a computer system. Such a computer system may be a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 103 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display may be a component of the client device 103 or may be connected to the client device 103 through a wired or wireless connection. The client device 103 can also be configured to execute various applications such as an operating system 166, a provisioning agent 169, and potentially other client applications.

The operating system 166 is system software that can be executed to manage hardware and software resources of the client device 103 and provide common services for applications executed by the client device 103. This can include facilities that identify and segregate or separate processes and resources belonging to multiple users and limiting user access to those processes and resources that belong to the user or to which the user has been granted permission. Examples of operating systems include various versions of MICROSOFT WINDOWS®, APPLE MACOS®, FREE-BSD®, NETBSD®, various distributions of GNU/Linux (e.g., UBUNTU®, REDHAT®, etc.), APPLE IOS®, GOOGLE ANDROID®, and similar systems.

The provisioning agent 169 can be executed to retrieve, install, and configure package files 133 on the client device 103 based at least in part on the current state of the client device 103. The provisioning agent 169 can also be configured to verify or validate individual package files 133 to be installed on the client device 103. The provisioning agent 169 can also be executed to check for updates to package files 133 and install any updated versions. In some implementations, the operating system 166 may provide the provisioning agent 169 with administrative rights to execute or perform the requisite functions.

The client device 103 can also have a client data store 173 accessible to applications executing on the client device 103. The client data store 173 can include relational databases, object-oriented databases, hierarchical databases, hash tables or similar key-value data stores, as well as other data storage applications or data structures. The data stored in the client data store 173 is associated with the operation of the various applications or functional entities described below. This data can include a user account identifier 143, a device identifier 159, device information 176, and potentially other data.

The device information 176 can represent information about the client device 103, such as the owner of the client device 103, the manufacturer and model of the client device 103, state information related to the client device 103 (e.g., whether a user account 129 identified by a user account identifier 143 has previously logged onto the client device 103, the current versions of package files 133 installed on the client device 103, etc.), a management environment or domain to which the client device 103 is assigned or joined, and potentially other information. The device information 176 can be used by the provisioning agent 169 to identify an appropriate provisioning service 113 to communicate with or select appropriate package files 133 for installation on the client device 103.

Next, a general description of the operation of the various components of the network environment 100 is provided. More specific and detailed descriptions of the individual components of the network environment 100 are provided in the discussion of the subsequent figures.

To begin, an IT employee or administrator configures one or more package files 133 for individual applications 156. After the package files 133 are created and configured, the IT employee or administrator can upload them using the management console 113 for storage in the data store 116. The IT employee or administrator can also assign individual package files 133 to specific user accounts or classes of user accounts 129. For example, the IT employee or administrator can use the management console 113 to create one or more compliance policies with the management service 109 to specify individual user accounts 129 or groups of user accounts 129 to which a package file 133 or group of package files 133 is to be assigned.

The IT employee or administrator can also configure a machine image containing an operating system 166 for a client device 103. The machine image can also have the provisioning agent 169 preinstalled. The machine image can be used to configure or prepare client devices 103 for use by individual users (e.g., members or employees of the organization or enterprise). For example, whenever a new member or employee joins or is hired, a new computing device may be purchased and provisioned for the employee. The machine image containing the provisioning agent 169 may be installed on the client device 103.

The provisioning agent 169 included in the machine image can be configured to connect to the provisioning service 113 through several approaches. In the first approach, the provisioning agent 169 can be preconfigured to connect to a predefined uniform resource locator (URL)

or internet protocol (IP) address specifying the discovery service 116. In the second approach, the provisioning agent 169 can connect to a discovery service 116 by default. The provisioning agent 169 may provide device information 176 and/or a device identifier 159 to the discovery service 116. In response, the discovery service 116 can provide the URL or IP address of the appropriate provisioning service 113 for the provisioning agent 169. For example, if the provisioning agent 169 provided device information indicating that the device was owned by Company A and a device identifier 159 that was registered or enrolled with the management service 109 of Company A, the discovery service 116 could provide the URL or IP address for a provisioning service 113 operated by or on behalf of Company A instead of a provisioning service 113 for Company B.

When a user logs onto the client device 103 for the first time and provides his or her account credentials (e.g., user account identifier 143 and authentication credentials), the provisioning agent 169 can detect the logon event and identify the user account identifier 143. The provisioning agent 169 can then send a request to the provisioning service 113 for a set of package files 133 to install and configure on the client device 103 for the user. The request can include the user account identifier 143 and potentially other device information 176.

The provisioning service 113 can then reference the applicable packages 146 for the user account 129 matching the user account identifier 143 supplied by the provisioning agent 169. The provisioning service 113 can then send copies of the package files 133 to the provisioning agent 169 in response. The provisioning service 113 may also provide a cryptographic hash 157 for each package file 133 and a cryptographic signature 158. This can permit the provisioning agent 169 to verify that the package files 133 have not been altered by an outside or untrusted party.

Once the provisioning agent 169 receives the appropriate package files 133 from the provisioning service 113, the provisioning agent 169 can install and configure the package files 133 on the client device 103. This can include, for example, installing the application 156 on the client device 103 and applying any specified configuration settings 153 to the application 156. As part of the installation process, the provisioning agent 169 can also store the package identifier 149 for each package file 133 installed on the client device as a component of the device information 176.

During the installation process upon a user's first logon, the provisioning agent 169 may also render a message on the display of the client device 103 to inform the user that his or her system is being configured and that additional applications are being installed on his or her behalf. In some embodiments, a status indicator can also be provided to indicate to the user how much time remains for the provisioning agent 169 to install all of the appropriate package files 133. Once installation of the package files 133 is complete, the logon process completes and the user is able to interact with his or her client device 103 as he or she would expect. A similar process may be performed if additional users logon to the client device 103 for the first time.

In some implementations, the provisioning agent 169 can continue to periodically query the provisioning service 113 for updates to the package files 133 installed on the client device 103. For example, the provisioning agent 169 can provide a list of package identifiers 149 to the provisioning service 113. If any updated versions of an application 156 are available, the provisioning service 113 may provide a response with updated package files 133 to be installed by the provisioning agent 169. The provisioning agent 169 could then install the updated package files 133 to the client device 103.

However, in some alternative implementations, one or more functions of the provisioning service 113 can be performed by the management service 109. For example, a client device 103 may enroll with the management service 109. As part of the enrollment process, the management service 109 may create a device record 136 for the client device 103 that includes the device information 176 and the device identifier 159 provided by the client device 103 as part of the enrollment process.

In addition, a certificate 139 can be generated as part of the enrollment process, which can be provided to the client device 103 for future authentication with the management service 109 or the provisioning service 113. The certificate 139 can be generated by the management service 109 itself or the certificate authority 119. The certificate 139 can be provided to the client device 103 as part of a profile or policy sent to the client device 103 upon completion of the enrollment process. However, in some implementations, the certificate 139 can be generated by the client device 103 and provided to the management service 109 as part of the enrollment process. In these implementations, the certificate 139 may be stored by the management service 109 for future use or reference by the management service 109 or the certificate authority 119.

In response to the enrollment of the client device 103 with the management service 109, the management service 109 may insert a command into a command queue stored in the data store 126. The command can then be retrieved from the command queue by the provisioning agent 169 and executed or performed by the provisioning agent 169. For example, the management service 109 may create and store in the command queue a command for the provisioning agent 169 to contact the provisioning service 113. The command may include the URL of the provisioning service 113. In response to receipt of the command, the provisioning agent 169 can then send a request to the provisioning service 113 for a set of package files 133 to install and configure on the client device 103 for the user. The request can include the user account identifier 143 and potentially other device information 176. One or more package files 133 can then be retrieved by the provisioning agent 169 and installed on the client device 103 as previously described.

Figure 2:
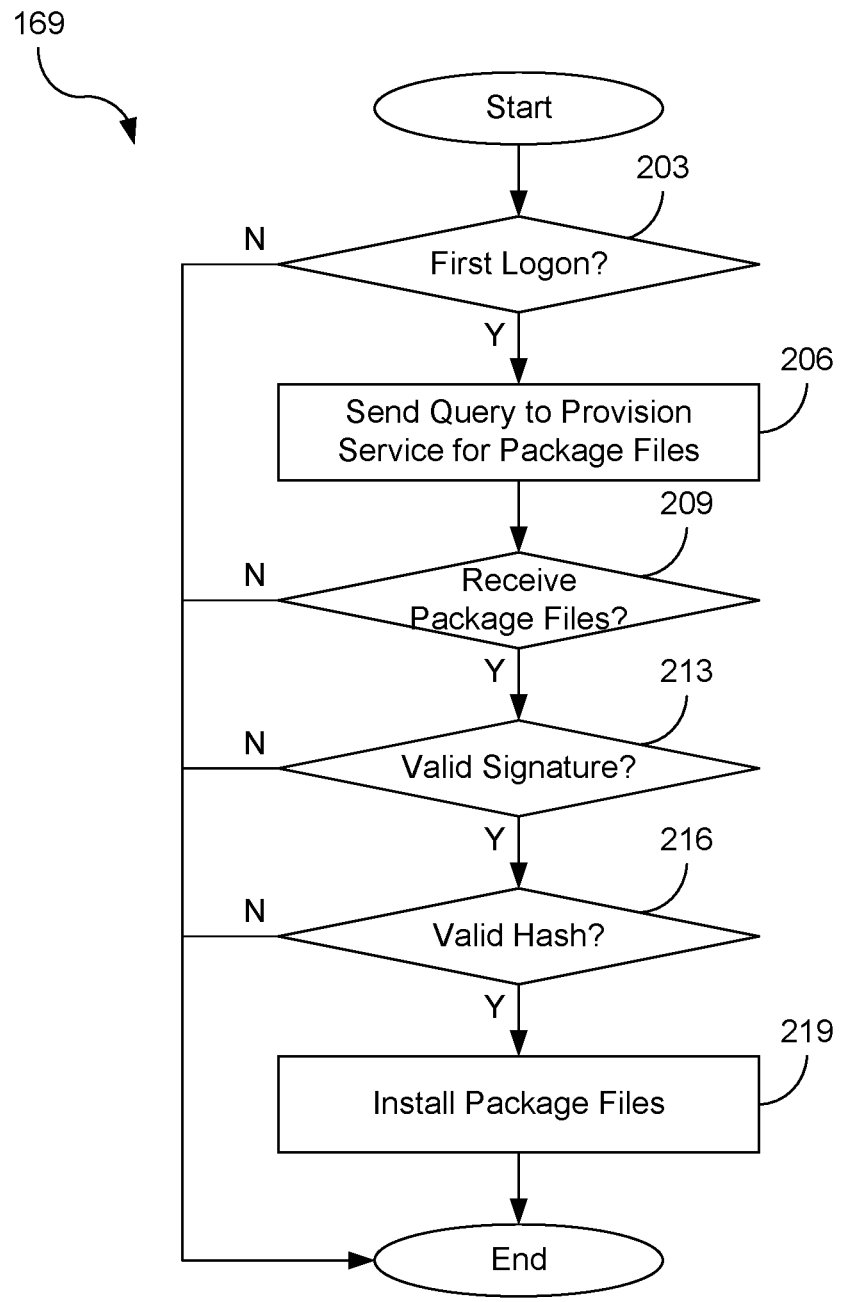
FIGS. 2 and 3 are flowcharts depicting the operation of components of the present disclosure.

Referring next to FIG. 2, shown is a flowchart that provides one example of the operation of a portion of the provisioning agent 169. It is understood that the flowchart of FIG. 2 provides merely an example of the many different types of functional arrangements that may be employed to implement the operation of the provisioning agent 169. As an alternative, the flowchart of FIG. 2 may be viewed as depicting an example of elements of a method implemented by the client device 103.

Beginning with step 203, the provisioning agent 169 can detect a logon event and determines whether the logon event is the first time a user account 129 has logged on to the client device 103. For example, the provisioning agent 169 might determine the user account identifier 143 of the user account 129. The provisioning agent 169 could then determine whether the user account 129 has logged onto the client device 103 previously by determining whether the user account identifier 143 has been previously stored with the device information 176. If the user account 129 has not previously logged onto the client device 103, then the process proceeds to step 206. Otherwise, the process ends as the client device 103 has already been configured by the provisioning agent 169.

Then at step 206, the provisioning agent 169 can send a query to the provisioning service 113. The query can include the user account identifier 143 of the user account 129 logging on to the client device 103. The query can cause the provisioning service 113 to determine which package files 133 are to be installed and configured on the client device 103 for the user account 129.

Next at step 209, the provisioning agent 169 can receive one or more package files 133 from the provisioning service 113. The package files 133 can be received in response to the query sent at step 306. While the provisioning agent 169 waits to receive and install the package files 133, the provisioning agent 169 may cause a message to be displayed within a user interface rendered on a display of the client device 103 to inform the user that the client device is being configured for their use. Once the package files 133 are received, the process proceeds to step 313. If no package files 133 are received, this may indicate that the client device 103 needs no additional configuration, in which case the process ends.

Proceeding to step 213, the provisioning agent 169 can determine whether the received package files 133 have a valid cryptographic signature 158. To confirm that the package files 133 are received from an authorized source, the provisioning service 113 can sign each package file 133 with a signing certificate 139 available to the provisioning service 113. The provisioning agent 169 can use the public key specified in the signing certificate 139 to verify the cryptograph signatures 158 received. If the cryptographic signature 158 accompanying each package file 133 is valid, then the process proceeds to step 316. However, if a cryptographic signature 158 is determined to be invalid, this could mean that an unauthorized third-party is attempting to induce the provisioning agent 169 into installing unauthorized package files 133 onto the client device 103. Accordingly, the installation process would end if the provisioning agent 169 were to determine that the cryptographic signature 158 were invalid.

Then at step 216, the provisioning agent 169 can also confirm that a first cryptographic hash 157 sent by the provisioning service 113 for a package file 133 matches a second cryptographic hash 157 generated by the provisioning agent 169. If the cryptographic hashes 157 match, then the provisioning agent 169 can determine that the package file 133 has not been altered or corrupted during transmission from the provisioning service 113 to the provisioning agent 169. Accordingly, the installation process could then proceed to step 319. However, if the hash values do not match, then the installation process could end or the provisioning agent 169 could request that the provisioning service 113 resend the package file 133 and/or accompanying hash (e.g., if the mismatched hash values were due to an error in transmission).

Subsequently at step 219, the provisioning agent 169 can install the received package files 133. First, the provisioning agent 169 can install the application 156 included in the package file 133. Upon installation, the provisioning agent 169 can also configure the installed application 156 according to the configuration settings 153 specified in the package file 133. Once all of the received package files 133 have been received, installed, and configured, the installation process of the provisioning agent 169 ends and the logon process of the user can continue.

Figure 3:
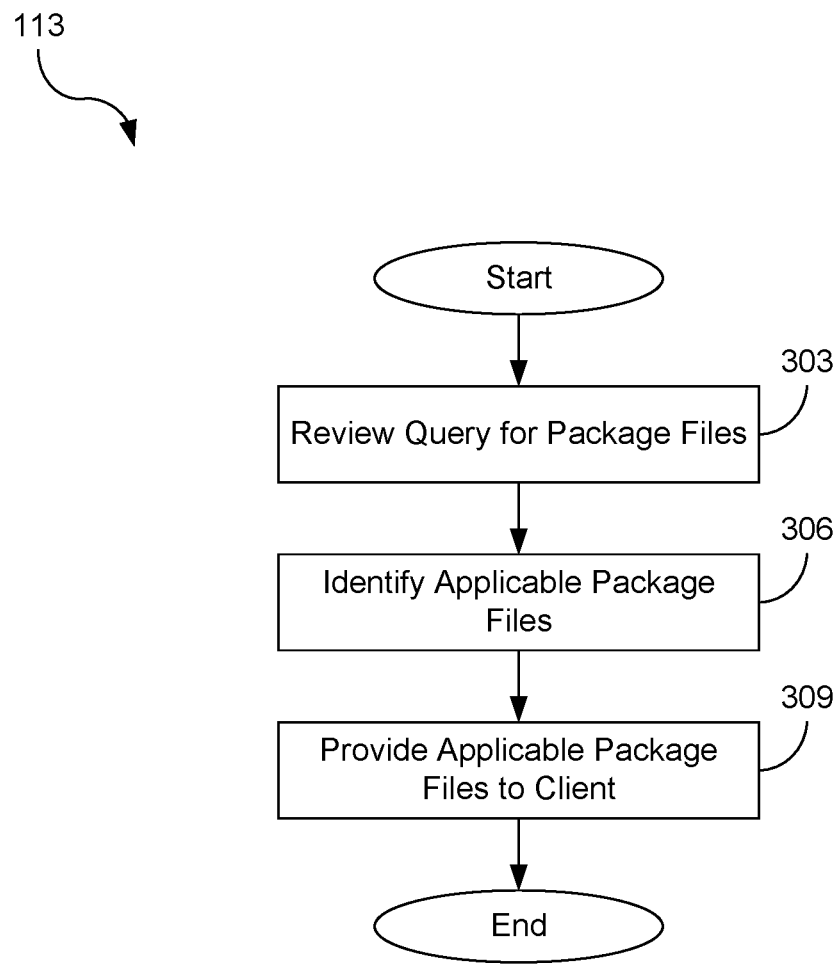

Referring next to FIG. 3, shown is a flowchart that provides one example of the operation of the provisioning service 113. It is understood that the flowchart of FIG. 3 provides merely an example of the many different types of functional arrangements that may be employed to implement the operation of the provisioning service 113. As an alternative, the flowchart of FIG. 3 may be viewed as depicting an example of elements of a method implemented in the computing environment 101.

Beginning at step 303, the provisioning service 113 can receive a query from the provisioning agent 169 for one or more package files 133. The query can include a user account identifier 143 and potentially other information.

Then at step 306, the provisioning service 113 can identify the applicable packages 146 for a respective user account 129. For example, the provisioning service 113 may perform a database query to search for the user account 129 referenced by the user account identifier 143. The provisioning service 113 can then identify the package identifiers 149 included in the set of applicable packages 146 specified for the user account 129.

Subsequently at step 309, the provisioning service 113 can return the appropriate set of applicable packages 146. For each package identifier 149 included in the set of applicable packages 146 for the user account identified by the user account identifier 143, the package identifier 149 may identify a package file 133 with a respective package identifier 149. The provisioning service 113 can then send the package file 133 to the provisioning agent 169 along with the cryptographic hash 157 of the package file 133 and the cryptographic signature 158 of the package file 133. Once the package files 133 specified in the set of applicable packages 146 for the user account 129 are sent to the requesting provisioning agent 169, the process ends.

Figure 4:
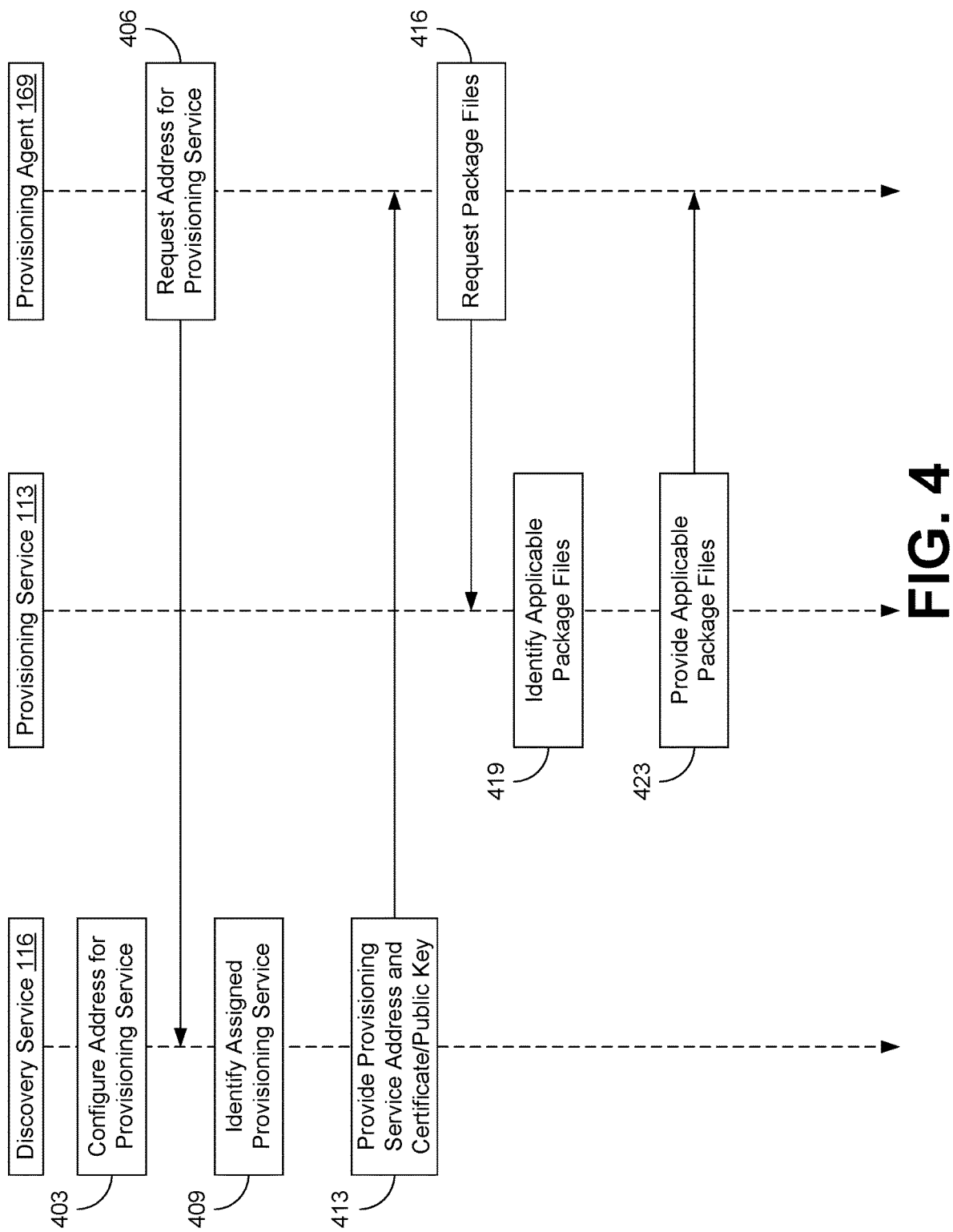
FIG. 4 is sequence diagram depicting the interaction between components of the present disclosure.

Referring next to FIG. 4, shown is a sequence diagram that provides one example of the interaction between various components of the network environment 100, such as the provisioning service 113, the discovery service 116, and the provisioning agent 169. It is understood that the sequence diagram of FIG. 4 provides merely an example of the many different sequences of interactions between the components of the network environment 100.

Beginning with step 403, the discovery service 116 can be configured with address information for a provisioning service 113. For example, an administrative user may provide through the management console 113 a URL and/or IP address for the provisioning service 113 used by his or her organization or enterprise. The administrative user could also provide a public encryption key or public key certificate 139 for the provisioning service 113, which some embodiments could use for implementations that make use of public key pinning or certificate pinning. In addition, the administrative user could provide a list of device identifiers 159 of client devices 103 that are to use the provisioning service 113 or specify an organizational identifier associated with the provisioning service 113 (e.g., any client device 103 that presents the specified organizational identifier would use the provisioning service 113).

Then at step 406, a provisioning agent 169 can contact the discovery service 116 with a request for the identity of the provisioning service 113 to be used by the provisioning agent 169. The provisioning agent 169 may provide an organizational identifier stored in the device information 176 of the client device 103 executing the provisioning agent 169 or a device identifier 159 of the client device 103.

Next at step 409, the discovery service 116 can identify the provisioning service 113 to be used by the provisioning agent 169 based at least in part on the device identifier 159 or organizational identifier provided by the provisioning agent 169. As part of the identification process, the discovery service 116 may determine the URL or IP address specified for the provisioning service 113 and any certificates 139 specified for the provisioning service 113.

Subsequently at step 413, the discovery service 116 can return the URL or IP address and any associated certificates 139 (e.g., pinned certificates 139) to the provisioning agent 169.

Then, at step 416, the provisioning agent 169 can send a request for applicable package files 133 to the provisioning service 113. The implementation of this step was previously described in further detail in the discussion of the flowchart of FIG. 2 and the description of the network environment 100 of FIG. 1.

Next at step 419, the provisioning service 113 can identify the applicable package files 133. Subsequently at step 413, the provisioning service 113 can provide the applicable package files 133 to the provisioning agent 169. The implementation of these steps was previously described in further detail in the discussion of the flowchart of FIG. 3 and the description of the network environment 100 of FIG. 1.

Although the management service 109, provisioning service 113, discovery service 116, certificate authority 119, management console 113, provisioning agent 169, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

The invention claimed is:

1. A system for automatically provisioning applications, comprising:
at least one computing device comprising a processor and a memory; and
machine-readable instructions stored in the memory that, when executed by the processor, cause the at least one computing device to:
  detect a logon event for the at least one computing device, the logon event being associated with a user account;
  determine device information of the at least one computing device and a user account identifier associated with the user account logging on the at least one computing device;
  send a discovery request to a discovery service for an identity of a provisioning service, the discovery request including the device information, wherein the discovery service identifies the provisioning service based on the device information;
  receive, from the discovery service, a locator of the provisioning service and one or more cryptographic certificates of the provisioning service;
  provide a query comprising the user account identifier associated with the user account to the provisioning service based on the locator to retrieve a set of packages corresponding to the user account identifier to install on the at least one computing device;
  receive the set of packages for the user account from the provisioning service;
  verify that the set of packages is received from an authorized source based on the one or more cryptographic certificates received from the discovery service; and
  upon verifying the set of packages, install, on the at least one computing device, individual packages from the set of packages.

2. The system of claim 1, wherein the set of packages is based at least in part on a list of packages currently installed on the at least one computing device.

3. The system of claim 1, wherein the query comprises the user account identifier for the user account and the device information of the at least one computing device.

4. The system of claim 1, wherein the machine-readable instructions, when executed by the processor, further cause the at least one computing device to at least determine that the logon event is a first login event associated with the user account.

5. The system of claim 1, wherein the machine-readable instructions that cause the at least one computing device to verify that the set of packages is received from the authorized source further cause the at least one computing device to at least validate at least one cryptographic signature associated with the set of packages based at least in part on a public key specified in the one or more cryptographic certificates.

6. The system of claim 1, wherein the machine-readable instructions that cause the at least one computing device to install on the at least one computing device the individual packages from the set of packages further cause the at least one computing device to at least:
cause an installation of an application included in an individual package from the set of packages; and
configure the application based at least in part on at least one configuration setting included in a file from the individual package.

7. The system of claim 1, wherein the machine-readable instructions, when executed by the processor, further cause the at least one computing device to at least confirm that a first hash from the provisioning service matches a second hash generated by a provisioning agent executing on the at least one computing device.

8. A method for automatically provisioning applications, comprising:
detecting a logon event for a client device, the logon event being associated with a user account;
determining device information of the client device and a user account identifier associated with the user account logging on the client device;
sending a discovery request to a discovery service for an identity of a provisioning service, the discovery request including the device information, wherein the discovery service identifies the provisioning service based on the device information;
receiving, from the discovery service, a locator of the provisioning service and one or more cryptographic certificates of the provisioning service;
sending a query comprising the user account identifier associated with the user account to the provisioning service based on the locator to retrieve a set of packages corresponding to the user account identifier to install on the client device;
receiving the set of packages for the user account from the provisioning service;
verifying that the set of packages are received from an authorized source based on the one or more cryptographic certificates received from the discovery service; and
upon verifying the set of packages, installing, on the client device, individual packages in the set of packages.

9. The method of claim 8, wherein the set of packages is based at least in part on a list of packages currently installed on the client device.

10. The method of claim 8, wherein the query comprises the user account identifier for the user account and the device information of the client device.

11. The method of claim 8, further comprising determining that the logon event is a first login event associated with the user account.

12. The method of claim 8, wherein verifying that the set of packages is received from the authorized source further comprises validating at least one cryptographic signature associated with the set of packages based at least in part on a public key specified in the one or more cryptographic certificates.

13. The method of claim 8, wherein installing on the client device the individual packages from the set of packages further comprises:
causing an installation of an application included in an individual package from the set of packages; and
configuring the application based at least in part on at least one configuration setting included in a file from the individual package.

14. The method of claim 8, further comprising confirming that a first hash from the provisioning service matches a second hash generated by a provisioning agent executing on the client device.

15. A non-transitory computer-readable medium for automatically provisioning applications, the non-transitory computer-readable medium comprising machine-readable instructions that, when executed by a processor, cause at least one computing device to:
detect a logon event for the at least one computing device, the logon event being associated with a user account;
determine device information of the at least one computing device and a user account identifier associated with the user account logging on the at least one computing device;
send a discovery request to a discovery service for an identity of a provisioning service, the discovery request including the device information, wherein the discovery service identifies the provisioning service based on the device information;
receive, from the discovery service, a locator of the provisioning service and one or more cryptographic certificates of the provisioning service;
send a query comprising the user account identifier associated with the user account to the provisioning service based on the locator to retrieve a set of packages corresponding to the user account identifier to install on the at least one computing device;
receive the set of packages for the user account from the provisioning service;
verify that the set of packages are received from an authorized source based on the one or more cryptographic certificates received from the discovery service; and
upon verifying the set of packages, install, on the at least one computing device, individual packages in the set of packages.

16. The non-transitory computer-readable medium of claim 15, wherein the query comprises the user account identifier for the user account and the device information of the at least one computing device.

17. The non-transitory computer-readable medium of claim 15, wherein the machine-readable instructions, when executed by the processor, further cause the at least one computing device to at least determine that the logon event is a first login event associated with the user account.

18. The non-transitory computer-readable medium of claim 15, wherein the machine-readable instructions that cause the at least one computing device to verify that the set of packages is received from the authorized source further cause the at least one computing device to at least validate at least one cryptographic signature associated with the set of packages based at least in part on a public key specified in the one or more cryptographic certificates.

19. The non-transitory computer-readable medium of claim 15, wherein the machine-readable instructions that cause the at least one computing device to install on the at least one computing device the individual packages from the set of packages further cause the at least one computing device to at least:
cause an installation of an application included in an individual package from the set of packages; and
configure the application based at least in part on at least one configuration setting included in a file from the individual package.

20. The non-transitory computer-readable medium of claim 15, wherein the set of packages is based at least in part on a list of packages currently installed on the at least one computing device.

* * * * *